US012808645B2

(12) United States Patent
Se

(10) Patent No.: US 12,808,645 B2
(45) Date of Patent: Nov. 24, 2026

(54) AUTONOMOUS VEHICLE MEASUREMENT SYSTEM

(71) Applicant: TuSimple, Inc., San Diego, CA (US)

(72) Inventor: Yisun Y Se, Tucson, AZ (US)

(73) Assignee: CreateAI, Inc., San Diego, CA (US)

( * ) Notice: Subject to any disclaimer, the term of this patent is extended or adjusted under 35 U.S.C. 154(b) by 241 days.

(21) Appl. No.: 18/752,628

(22) Filed: Jun. 24, 2024

(65) Prior Publication Data

US 2025/0003723 A1 Jan. 2, 2025

Related U.S. Application Data

(60) Provisional application No. 63/510,613, filed on Jun. 27, 2023.

(51) Int. Cl.

*G01B 3/30* (2006.01)
*G01B 5/00* (2006.01)
*G01B 21/04* (2006.01)

(52) U.S. Cl.

CPC ............ *G01B 3/30* (2013.01); *G01B 5/0025* (2013.01); *G01B 21/04* (2013.01)

(58) Field of Classification Search

CPC ..... G01L 3/00; G01L 3/02; G01L 3/04; G01L 3/10; G01B 3/30; G01B 5/0025;

(Continued)

(56) References Cited

U.S. PATENT DOCUMENTS 4,598,481 A * 7/1986 Donahue .............. G01B 5/0025 33/600
4,942,667 A * 7/1990 Fournier .............. G01B 11/275 33/608

(Continued)

FOREIGN PATENT DOCUMENTS

WO 2018031830 A1 2/2018
WO 2019231472 A1 12/2019
WO 2019231474 A1 12/2019

OTHER PUBLICATIONS

Sahin, Olcay, "Truck Trailer Classification Using Side-Fire Light Detection and Ranging (LiDAR) Data" Spring 2020.

(Continued)

*Primary Examiner* — Peter J Macchiarolo
(74) *Attorney, Agent, or Firm* — Ashurst Perkins Coie US LLP

(57) ABSTRACT

A mechanical measurement apparatus can measure one or more dimensions of a vehicle or an object. An example, mechanical measurement apparatus comprises a rail that extends lengthwise in a first direction; a movable member that is movably coupled to the rail to move along the rail in the first direction, where the movable member vertically extends in a second direction that is perpendicular to the first direction, where the movable member includes a region that is couplable to a first laser source device, and where the movable member includes a surface; and a plurality of alignment devices coupled to the rail, where each alignment device extends in a third direction perpendicular to the first direction and the second direction, and where the plurality of alignment devices includes a first alignment device that comprises a base segment which is couplable to a measurement device.

18 Claims, 8 Drawing Sheets

(58) Field of Classification Search
CPC ........ G01B 21/04; G01B 21/02; G01B 21/00; G01B 5/00
USPC .......... 33/228, 227, 562, 503, 288, 600, 608
See application file for complete search history.

(56) References Cited

U.S. PATENT DOCUMENTS

| | | | | |
|---|---|---|---|---|
| 5,125,164 | A * | 6/1992 | Fournier | G01B 11/27 33/608 |
| 5,295,073 | A * | 3/1994 | Celette | G01B 11/002 701/33.1 |
| 7,874,078 | B2 * | 1/2011 | Harrill | G01B 11/16 33/608 |
| 8,381,409 | B2 * | 2/2013 | Knoke | G01B 11/24 33/228 |
| 9,279,740 | B2 * | 3/2016 | Kerestan | G01M 9/062 |
| 10,022,777 | B2 * | 7/2018 | Cagle | G01M 17/007 |
| 10,573,012 | B1 * | 2/2020 | Collins | G06F 18/40 |
| 11,162,785 | B2 * | 11/2021 | Newkirk | G01B 11/275 |
| 11,293,751 | B2 * | 4/2022 | Johnson | G01B 5/0004 |
| 11,597,091 | B2 * | 3/2023 | Lawrence | G01S 7/4972 |
| 12,044,519 | B2 * | 7/2024 | Van Esch | G01B 5/20 |
| 12,270,639 | B2 * | 4/2025 | Bretl | G01B 11/25 |
| 12,509,080 | B2 * | 12/2025 | Delizo | B60D 1/62 |
| 2013/0139396 | A1 * | 6/2013 | Knoke | G01B 11/24 33/228 |
| 2014/0046589 | A1 * | 2/2014 | Metzler | G01B 21/04 356/3.09 |
| 2015/0219432 | A1 * | 8/2015 | Liu | A61B 5/1072 33/512 |
| 2018/0052223 | A1 * | 2/2018 | Stieff | G01B 11/026 |
| 2018/0188022 | A1 * | 7/2018 | Leikert | G01B 11/2755 |
| 2022/0032913 | A1 * | 2/2022 | Delizo | B60D 1/62 |

OTHER PUBLICATIONS

McCullough, Bernard C. "A Two-Point Vehicle Classification System" Transportation Research Record 1215 (Published 1989).

* cited by examiner

AUTONOMOUS VEHICLE MEASUREMENT SYSTEM

CROSS-REFERENCE TO RELATED APPLICATIONS

This document claims priority to and the benefit of U.S. Provisional Patent Application No. 63/510,613, filed on Jun. 27, 2023. The aforementioned application of which is incorporated herein by reference in its entirety.

TECHNICAL FIELD

This document relates to systems, apparatuses, and methods to measure one or more dimensions related to an autonomous vehicle.

BACKGROUND

Autonomous vehicle navigation is a technology that can allow a vehicle to sense the position and movement of vehicles around an autonomous vehicle and, based on the sensing, control the autonomous vehicle to safely navigate towards a destination. An autonomous vehicle may control the steering angle, a throttle amount to control the speed of the autonomous vehicle, gear changes, and/or a breaking amount to control the extent to which the brakes are engaged. An autonomous vehicle may operate in several modes. In some cases, an autonomous vehicle may allow a driver to operate the autonomous vehicle as a conventional vehicle by controlling the steering, throttle, clutch, gear shifter, and/or other devices. In other cases, a driver may engage the autonomous vehicle navigation technology to allow the vehicle to be driven by itself.

SUMMARY

This patent document describes systems, apparatuses, and methods to measure one or more dimensions between points on or in an autonomous vehicle.

An example method of measuring a dimension includes coupling a plurality of alignment devices to a rail that that extends lengthwise in a first direction, where each alignment device extends in a third direction perpendicular to the first direction; placing a movable member on the rail, where the movable member is structured to move along the rail in the first direction, where the movable member vertically extends in a second direction that is perpendicular to the first direction and the third direction, where the movable member includes a region that is couplable to a first laser source device that is configured to project a first laser line, and where the movable member includes a surface; and performing a measurement using a measurement device that is coupled to a base segment of a first alignment device from the plurality of alignment devices, where the measurement device is configured to project a laser beam on the surface to measure a distance between a first location of the measurement device and a second location of the movable member.

In some embodiments, the measurement device includes a display that shows the distance between the first location of the measurement device and the second location of the movable member. In some embodiments, each of the plurality of alignment devices includes one end that that furthest away from the rail, wherein the one end of each of the plurality of alignment devices is in contact with a wheel of a vehicle. In some embodiments, the surface is coupled to a bottom region of the movable member. In some embodiments, the rail has a same length that is greater than or equal to than another length from a front bumper of a vehicle to a rear bumper of the vehicle.

An example measurement apparatus comprises a rail that extends lengthwise in a first direction; a movable member that is movably coupled to the rail to move along the rail in the first direction, where the movable member vertically extends in a second direction that is perpendicular to the first direction, where the movable member includes a region that is couplable to a first laser source device, and where the movable member includes a surface; and a plurality of alignment devices coupled to the rail, where each alignment device extends in a third direction perpendicular to the first direction and the second direction, and where the plurality of alignment devices includes a first alignment device that comprises a base segment which is couplable to a measurement device.

In some embodiments, the rail includes two beams that are coupled to each other via a plurality of bars that extend between the two beams, wherein each bar is located at some distance away from at least one other bar. In some embodiments, at least two bars of the plurality of bars have a same length along the third direction. In some embodiments, the movable member comprises a first vertical bar and a second vertical bar, the first vertical bar and the second vertical bar extend upward and away from the rail in the second direction, a bottom region of the first vertical bar and the second vertical bar is coupled to the rail, and the first vertical bar includes the region that is couplable to the first laser source device.

In some embodiments, the first vertical bar has a first height, and the second vertical bar has a second height, wherein the first height and the second height are along the second direction. In some embodiments, the first height is same as the second height. In some embodiments, the measurement apparatus further comprises a slidable apparatus movable coupled to a top region of the first vertical bar and the second vertical bar, where the slidable apparatus is structured to move towards or away from the movable member, and one end of the slidable apparatus includes another region that is couplable to a second laser source device. In some embodiments, the first alignment device includes the base segment and two end sections, the base segment is coupled to the rail, and first ends of the two end sections furthest away from the base segment are separated by some distance.

In some embodiments, one end of the base segment is coupled to a first end of each of two middle sections, each of the two middle sections extends at an angle away from the base segment, and second ends of the two middle sections are respectively and pivotably coupled to second ends of the two end sections. In some embodiments, the second ends of the two middle sections are respectively and pivotably coupled to the second ends of the two end sections via spring loaded hinges. In some embodiments, the plurality of alignment devices includes a second alignment device and a third alignment device that extend in the third direction, and one end of the second alignment device and one end of the third alignment device are coupled the rail. In some embodiments, the second alignment device and the third alignment device have a same length along the third direction, the second alignment device is coupled to a first bar segment and the third alignment device is coupled to a second bar segment at a same predetermined location, and the second alignment device and the third alignment device are respectively perpendicular to the first bar segment and the second bar segment.

In some embodiments, the second alignment device is coupled to a first bar segment at a pre-determined distance from one end of the second alignment device, the third alignment device is coupled to a second bar segment at the pre-determined distance from one end of the third alignment device, and the second alignment device and the third alignment device are respectively perpendicular to the first bar segment and the second bar segment. In some embodiments, the measurement apparatus further comprises a third bar segment having a first clamp on a first end and a second clamp on a second end, wherein the first clamp and the second clamp are removably coupled to the second alignment device and the third alignment device. In some embodiments, the third bar segment has a length that is greater than a third distance between the second alignment device and the third alignment device, and the length is along the first direction.

The above and other aspects and their implementations are described in greater detail in the drawings, the descriptions, and the claims.

DETAILED DESCRIPTION

An autonomous vehicle includes sensors that allow computer(s) or server(s) located in the autonomous vehicle to obtain data from the sensors to determine how to navigate from a on a road that may include static object(s) (e.g., pedestrian, speed bump) or dynamic object(s) (e.g., vehicles). The computer(s) or server(s) located in the autonomous vehicle may also store a configuration data that includes measurements related to the autonomous vehicle so that the computer(s) and server(s) can use the stored measurement information to safely navigate (e.g., steer) the autonomous vehicle to a destination. The systems, apparatuses, and methods described in this patent document facilitate one or more measurements of points on or in the autonomous vehicle.

Figure 1:
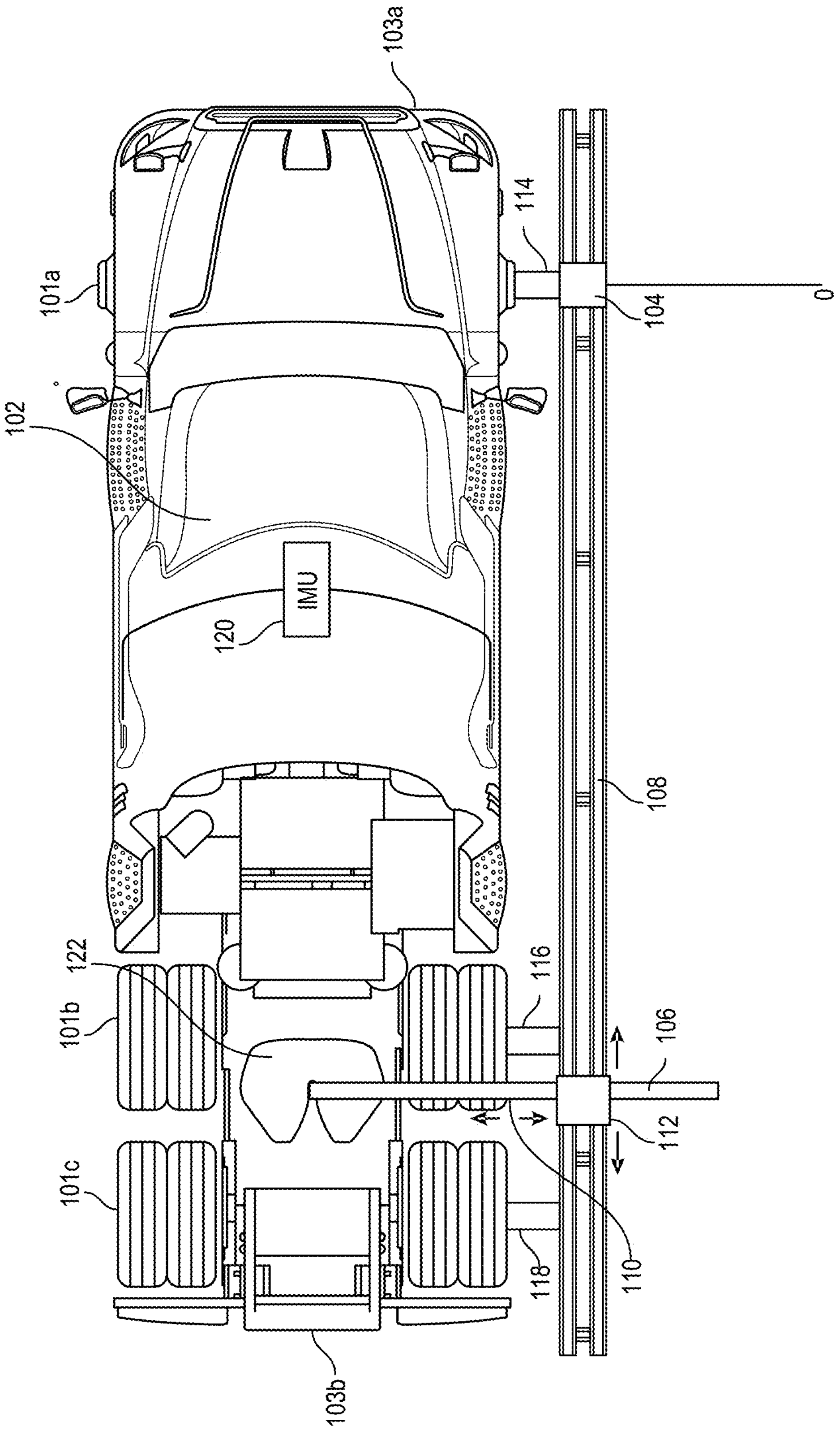
FIG. 1 is a top-down view of a high-level diagram of an example mechanical measurement apparatus to measure one or more dimensions of a vehicle.

FIG. 1 is a top-down view of a high-level diagram of an example mechanical measurement apparatus to measure one or more dimensions of a vehicle. The vehicle 102 may be a tractor unit of a semi-trailer truck having multiple axles 101*a*-101*c* and a fifth wheel 122. For instance, the vehicle 102 may include a front axle 101*a* having a first set of wheels, a middle axle 101*b* having a second set of wheel, and a rear axle 101*c* having a third set of wheels. The vehicle 102 may also include one or more sensors located on or in the vehicle. For example, the vehicle 102 may include an inertial measurement unit (IMU) device 120 that may be located in the tractor unit (e.g., in a middle region of the tractor unit) of the vehicle 102.

The mechanical measurement apparatus includes a rail 108 that may be substantially parallel to the vehicle 102. The rail 108 may be placed on a floor and extends lengthwise from approximately a front region of the vehicle 102 to approximately the rear region of the vehicle 102. In some embodiments, a length of the rail 108 is greater than or equal to another length from a front bumper 103*a* of the vehicle 102 to a rear bumper 103*b* of the vehicle 102 so that the rail 108 can extend up to or past the front region and the rear region of the vehicle 102 to allow measurement(s) between any two points in between the front bumper 103*a* of the vehicle 102 and the rear bumper 103*b* of the vehicle 102. The rail 108 includes a plurality of alignment devices 114, 116, 118, where the alignment devices 116, 118 can cause the rail 108 to be substantially parallel to the vehicle 102. One side of the first alignment device 114 may be coupled to the rail 108, and another side of the first alignment device 114 may be removably coupled to or may be removably in contact with or may removably press up against a tread of a wheel of the front axle 101*a*. One side of each of the second and third alignment devices 116, 118 may be coupled to the rail 108, and another side of each of the second and third alignment devices 116, 118 may be removably coupled to or may be removably in contact with or may be removably press up against a tread of the wheels of the middle axle 101*b* and rear axle 101*c*, respectively. The features of the alignment device 114 is further described in FIGS. 2-3C, and the features of the alignment devices 116, 118 are further described in FIGS. 2, 4A-4B.

A movable apparatus (or movable member) 112 is movably coupled to the rail 108 so that the movable apparatus 112 may slide along the length of the rail 108 from the front region of the vehicle 102 to the rear region of the vehicle 102. As further explained in FIG. 2, the movable apparatus 112 may be structured to allow a slidable apparatus 110 to slide towards or away from the middle region of the vehicle 102. The features of the movable apparatus 112 and slidable apparatus 110 are further described in FIG. 2.

A target plate 106 may be coupled to the movable apparatus 112 in a manner that causes the target plate 106 to be aligned with the laser measurement device 104 that is coupled to the rail 108. In some embodiments, the laser measurement device 104 may be removably coupled to the rail 108 via a region on the first alignment device 114. The laser measurement device 104 may be configured to project a laser light onto a target plate 106 and may include a display to show a distance measured from the laser measurement device 104 to the target plate 106.

Figure 2:
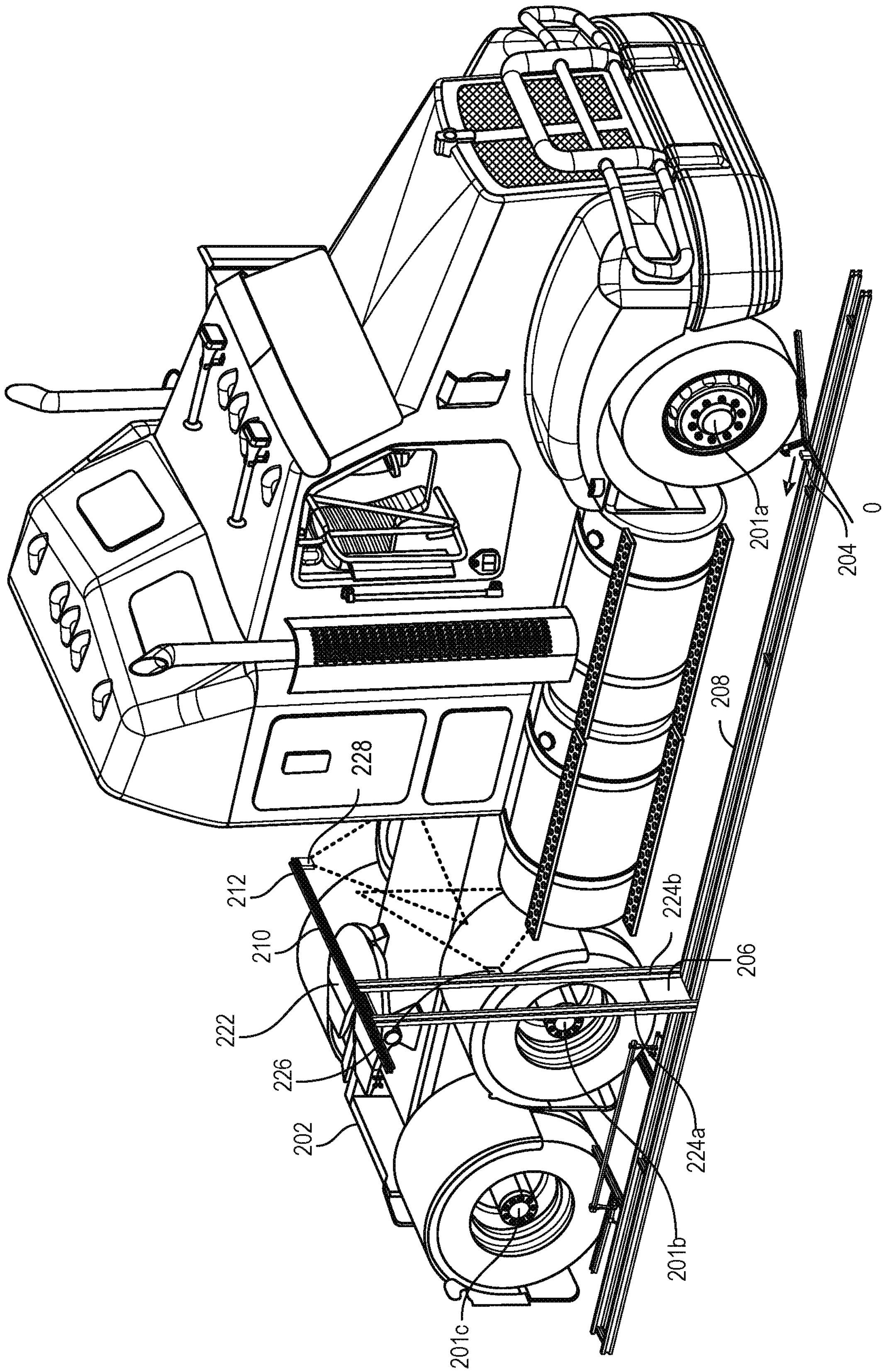
FIG. 2 is an isometric view of an example mechanical measurement apparatus to measure one or more dimensions of a vehicle.

FIG. 2 is an isometric view of an example mechanical measurement apparatus to measure one or more dimensions of a vehicle. The vehicle 202 may be a tractor unit of a semi-trailer truck having multiple axles 201*a*-201*c* and a fifth wheel 222. The vehicle 202 may include one or more sensors (e.g., IMU device) located on or in the vehicle.

The example mechanical measurement apparatus includes a rail 208 that may be placed on a floor or ground and may be substantially parallel to the vehicle 202. The rail 208 may include two substantially parallel beams that extend lengthwise from approximately a front region of the vehicle 202 to approximately the rear region of the vehicle 202. In some embodiments, the two substantially parallel beams of the rail 208 may lengthwise extend up to or past the front bumper and the rear bumper of the vehicle 202 to allow measurement(s) between any two points in between the front and rear bumpers of the vehicle 202. The two substantially parallel beams of the rail 208 are coupled to each other via a plurality of horizontal members or bars that extend between the two beams. Each horizontal member or bar can be located at some distance away from at least one other horizontal member or bar. The plurality of horizontal members or bars can have at least two horizontal members or bars (or all horizontal members or bars) that have a same length so that the two beams can be parallel to each other. The length of the horizontal members or bars is along a direction in which the horizontal members or bars extend.

A bottom region of a movable apparatus (or movable member) 212 is movably coupled to the rail 208. The movable apparatus 212 can slide along the length of the rail 208 from the front region of the vehicle 202 to the rear region of the vehicle 202. The movable apparatus 212 may include two vertical bars 224*a*, 224*b* that extend vertically above the rail 208. In some embodiments, the bottom regions of a first vertical bar 224*a* and a second vertical bar 224*b* may be coupled to each other via a base member that extends across the beams of the rail 208 and that may be coupled to the beams of the rail 208. The two vertical bars 224*a*, 224*b* may have a first height and a second height, respectively. The heights of the two vertical bars 224*a*, 2224*b* can allow a top region of the movable apparatus 212 to be above the fifth wheel 222, where the first height of the vertical bars 224*a*, 224*b* is less than a second height from the floor to the topmost region of the tractor unit of the vehicle 202. In some embodiments, the first and second heights can be the same.

The vertical bar 224*b* closest to the vehicle 202 may include a region to which a laser level device (or laser source device) 226 can be removably coupled. The laser level device 226 is configured to project a laser line onto the vehicle 202. As shown by the shaded triangle-like shape, the laser level device 226 can vertically project a laser line (e.g., in a same direction as the height of the vertical bar 224*b*) along at least a side of the vehicle 202.

A slidable apparatus 210 may be movably coupled to a top region of the two vertical bars 224*a*, 224*b*. The top region of the two vertical bars 224*a*, 224*b* may be structured to allow the slidable apparatus 210 to slide towards or away from the middle region of the vehicle 202. In some embodiments, the slidable apparatus 210 may have a fixed length that may be longer than a distance from the outermost beam of the rail 208 to a point within the fifth wheel 222 (e.g., a center of the fifth wheel 222). Having this length can be advantageous to enable a laser level device 228 to horizontally project a laser line as shown by the shaded triangle-like shape (e.g., in a same direction as the length of the slidable apparatus) onto at least a chassis of the vehicle 202 or the fifth wheel 222. The laser level device 228 can be removably coupled to a region on the bottom of the slidable apparatus 210, and to an end of the slidable apparatus 210 that is located above the chassis or the fifth wheel 222. The end of the slidable apparatus 210 to which the laser level device 228 is coupled is furthest away from the two vertical bars 224*a*, 224*b*. In an example implementation, the laser line projected by the laser level device 228 can enable the movable apparatus 212 to be lined up along the rail 208 to a specific location of a fifth wheel 222 (e.g., the center of the fifth wheel 122) so that the laser measurement device 204 can measure a distance from the front axle 201*a* to a point on the fifth wheel 222 (e.g., to a center of the fifth wheel 222 as shown in FIG. 2).

A target plate (or target surface) 206 is coupled to a bottom region of the movable apparatus 212. The target plate 206 may be coupled in between the two vertical bars 224*a*, 224*b* so that the target plate 206 can be aligned with the laser measurement device 204. Thus, the target plate 206 can receive a laser beam projected by the laser measurement device 204 located in between the two beams of the rail 208. In some embodiments, the laser measurement device 204 may be coupled to the rail 208 via a first alignment device 214. The laser measurement device 204 may be configured to project a laser light onto a target plate 206 and may include a display to show a distance measured from the laser measurement device 204 to the target plate 206.

A plurality of alignment devices 214, 216, 218 are coupled to one or more beams of the rail 208. The alignment devices 214, 216, 218 are structured to cause the rail 208 to be substantially parallel to the vehicle 202. The features of the first alignment device are further explained in the context of FIGS. 3A-3C, and the features of the second and third alignment devices 216, 218 are further explained in the context of FIGS. 4A-4B.

Figure 3A:
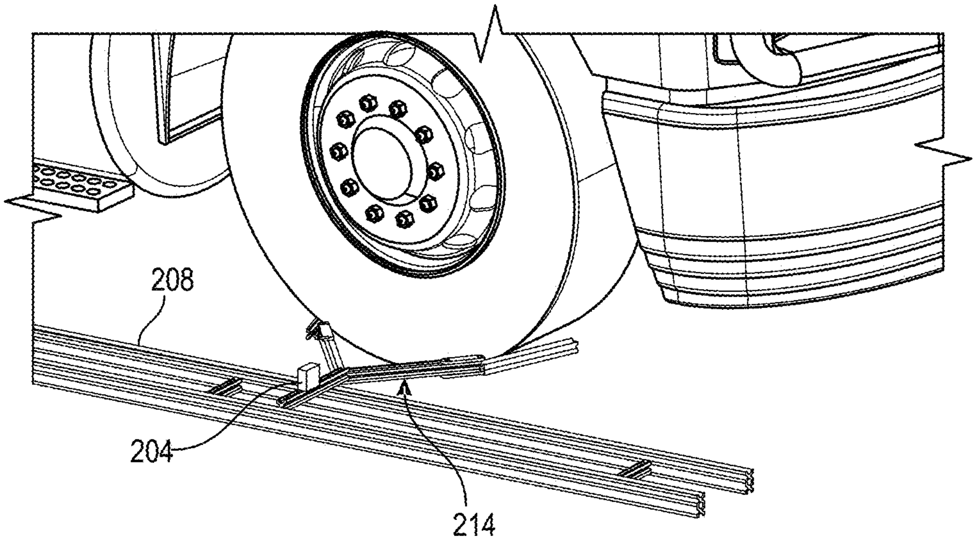
FIG. 3A shows a first alignment device having one side coupled to the rail and another side removably in contact with a tread of a wheel of a front axle.
Figure 3B:
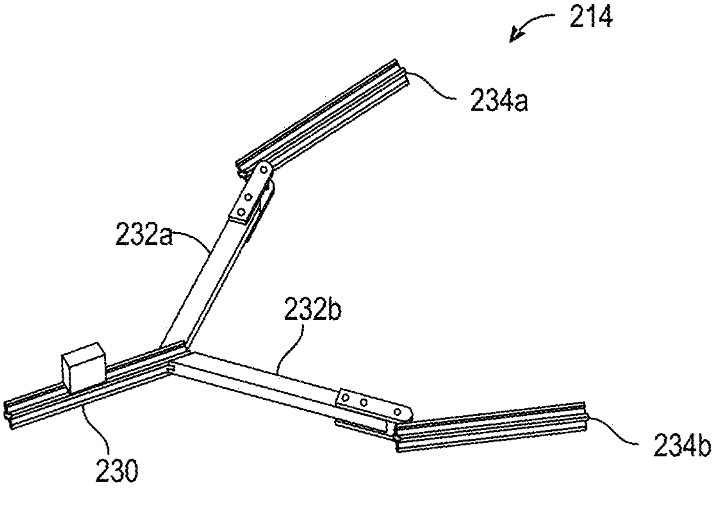
FIG. 3B shows the first alignment device with three sections.
Figure 3C:
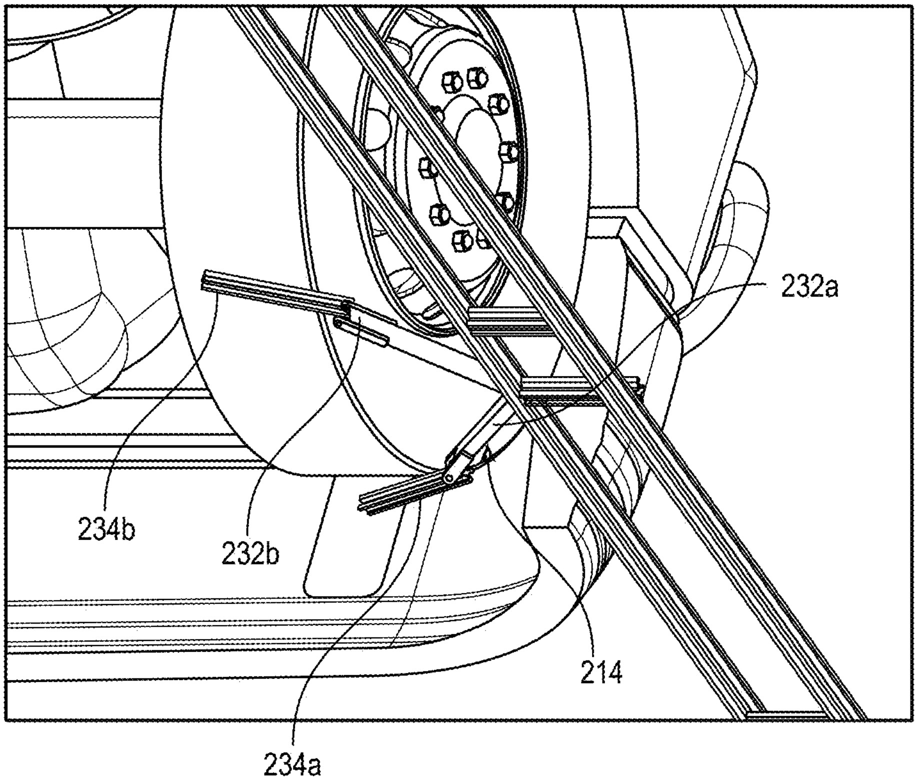
FIG. 3C shows another view from below a wheel of a front axle where at least some portions of the first alignment device are removably in contact with a tread of the wheel of the front axle.

FIG. 3A shows a first alignment device 214 having one side coupled to the rail 208 and another side removably coupled to or removably in contact with or removably press up against a tread of a wheel of a front axle. FIG. 3B shows the first alignment device 214 as generally having a "Y" shape with three sections. The first section of the "Y" shape includes a base segment 230 that when coupled to the rail 208 can be substantially perpendicular to the beams of the rail 208. In some embodiments, the base segment 230 may be located on top of the beams of the rail 208. The base segment 230 is coupled to a laser 204. One end of the base segment 230 is coupled to one end of two middle sections 232*a*, 232*b* that extend at an angle away from the base segment 230. Each of the two middle sections 232*a*, 232*b* is located at an obtuse angle away from the base segment 230. The other ends of the middle sections 232*a*, 232*b* are coupled to end sections 234*a*, 234*b*. The end sections 234*a*, 234*b* can be coupled to the middle sections 232*a*, 232*b* via spring loaded hinges so that the end sections 234*a*, 234*b* can pivot and move inwards towards an inner region in between the two middle sections 232*a*, 232*b*. The pivotable end sections 234*a*, 234*b* are structured to allow the first alignment device 216 to be removably coupled to or removably in contact with or removably press up against a tread of a wheel of the front axle 201*a* as shown in FIG. 3A so that when the base segment 230 is coupled to the rail 208 the rail 208 can be substantially parallel to the vehicle 202. The pivotable end sections 234*a*, 234*b* can enable the base segment 230 of the first alignment device 214 to be lined up to or aligned with the front axle of the vehicle 202. FIG. 3C shows another view from below the wheel of the front axle where at least some portions of the pivotable end sections 234*a*, 234*b* of the first alignment device 214 are removably coupled to or removably in contact with or removably press up against the tread of the wheel of the front axle.

Figure 4A:
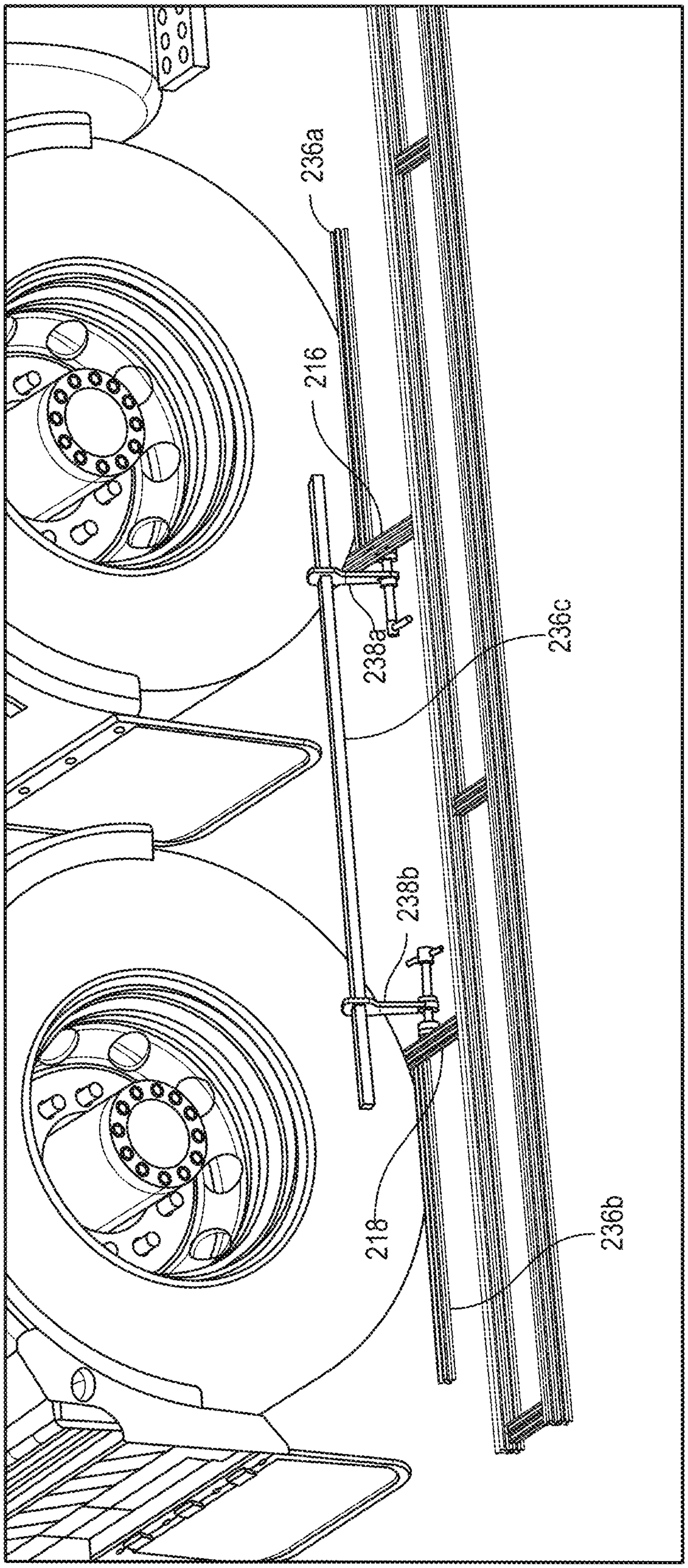
FIG. 4A shows a second and third alignment devices having one side coupled to the rail and another side having at least some portion that are removably in contact with treads of the wheels of middle and rear axles, respectively.
Figure 4B:
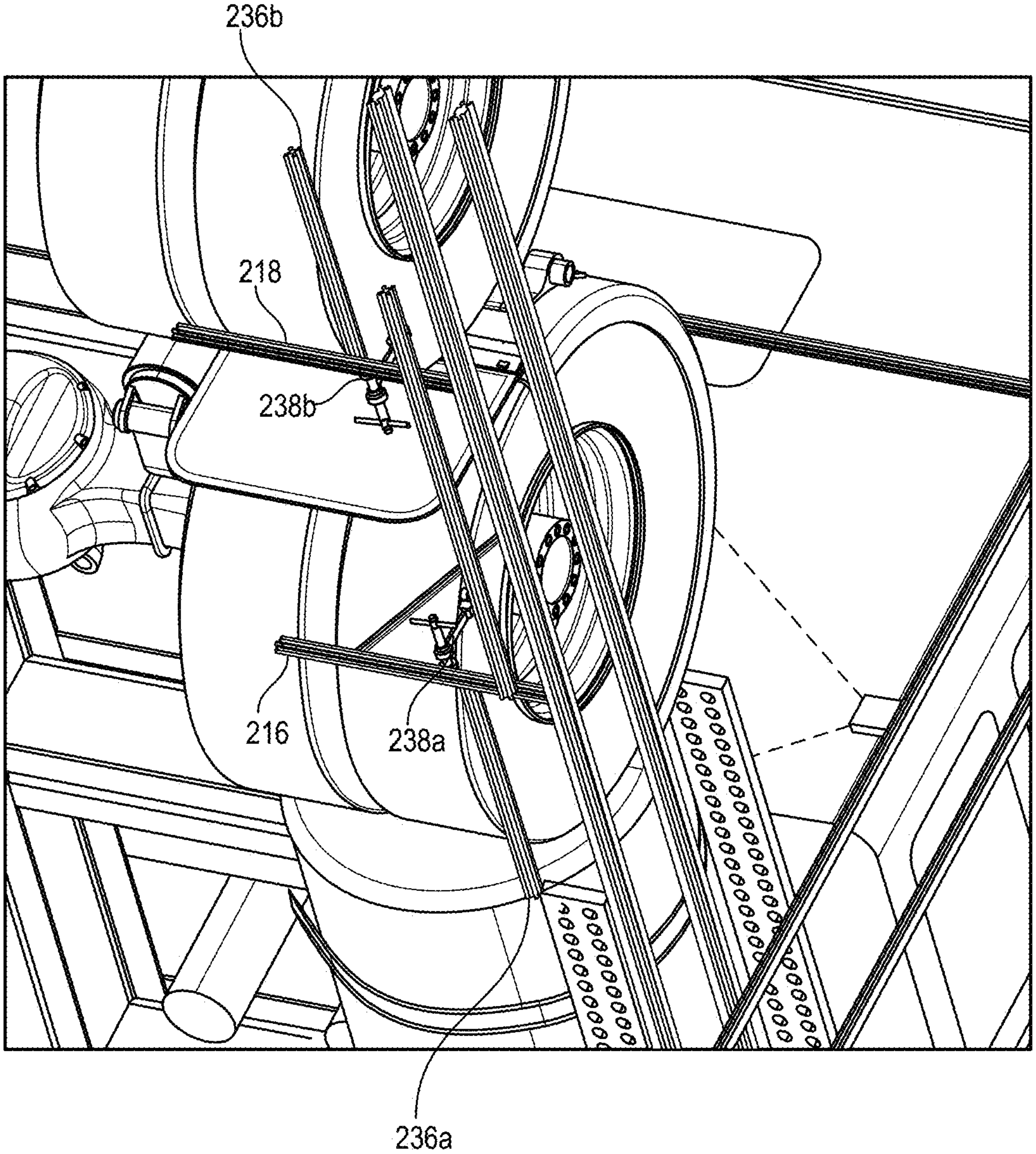
FIG. 4B shows another view from below the wheels of middle and rear axles where the second and third alignment devices have at least some portions of one end that are removably in contact with the wheels of middle and rear axles, respectively.

FIG. 4A shows a second and third alignment devices 216, 218 each having one side coupled to the rail 208 and another side having at least some portions that are removably coupled to, or removably in contact with, or removably push up against treads of wheels of the middle and rear axles, respectively. FIG. 4B shows another view from below the wheels of the middle and rear axles where the second and third alignment devices 216, 218 each have at least some portions of one end that are removably coupled to, or removably in contact with, or removably push up against treads of wheels of the middle and rear axles, respectively. The ends of the second and third alignment devices 216, 218 that are closest to the rail 208 are coupled to a beam of the rail 208 that is closest to the vehicle 202. The second and third alignment devices 216, 218 are respectively coupled to one end of first horizontal bar 236*a* and one end of a second horizontal bar 236*b*. In some embodiments, the second and third alignment devices 216, 218 may have a same length.

The two alignment devices 216, 218 and the two horizontal bars (or two bar segments) 236*a*, 236*b* can allow the rail 208 to be substantially parallel to the vehicle 208. The two alignment devices 216, 218 can be respectively coupled to the two horizontal bars or two bar segments 236*a*, 236*b* so that the second alignment device 216 is perpendicular to the horizontal bar 236*a*, and the third alignment device 218 is perpendicular to the horizontal bar 236*b*. In one example implementation where the second and third alignment devices 216, 218 have a same length, the first and second horizontal bars 236*a*, 236*b* may be respectively coupled to the second and third alignment devices 216, 218 at a same pre-determined location along the two alignment devices 216, 218 so that the rail 208 may be substantially parallel to the vehicle 202 when the two alignment devices and the two horizontal bars 236*a*, 236*b* are respectively in contact with or pushed up or lined up against the treads and sides of the wheels. In another example implementation, the first and second horizontal bars 236*a*, 236*b* may be respectively coupled to the second and third alignment devices 216, 218 at a same pre-determined distance from the ends of the two alignment devices 216, 218 that are coupled to a beam of the rail 208 so that the rail 208 may be substantially parallel to the vehicle 202 when the two alignment devices and the two horizontal bars 236*a*, 236*b* are in contact with or are pushed up and/or are lined up against the sides of the wheels.

The two alignment devices 216, 218 may be removably coupled to or removably in contact with or to removably pushed up against the treads of the wheels of the middle and rear axles using a third horizontal bar or third bar segment 236*c*. The third horizontal bar 236*c* can have a length that is longer than a distance between the two alignment devices 216, 218 when they are up against the inner sides of treads of the wheels of the middle and rear axles. Each end of the third horizontal bar 236*c* includes a spreading clamp 238*a*, 238*b* so that an outward force can be respectively exerted by the spreading clamps 238*a*, 238*b* against the two alignment devices 216, 218 causing the two alignment devices 216, 218 to push up against the inner sides of the treads of the wheels of the middle and rear axles. Thus, the spreading clamps 238*a*, 238*b* can respectively be removably coupled to, and exerts a force against, the two alignment devices 216, 218, respectively.

Figure 5:
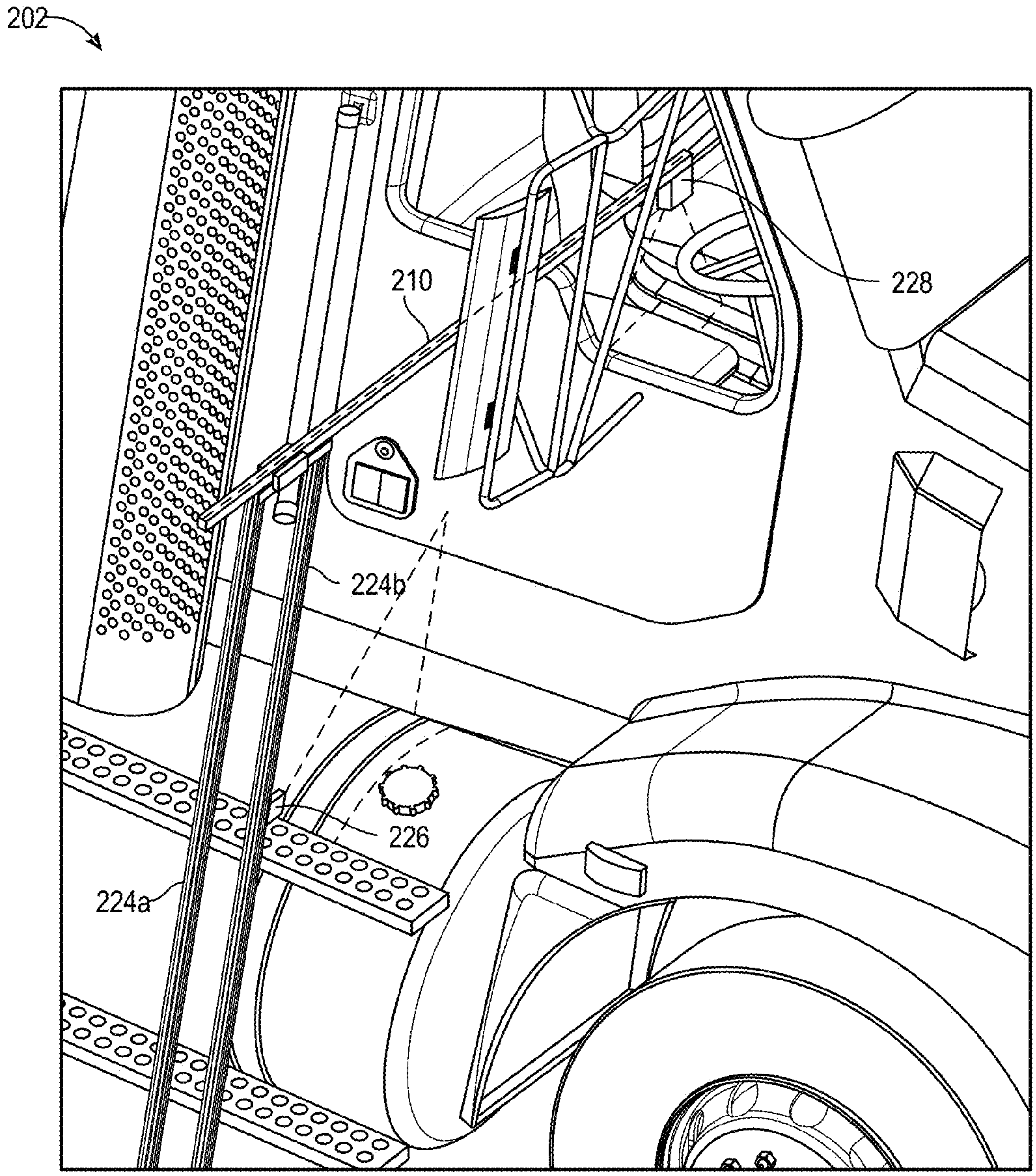
FIG. 5 shows an example scenario where a slidable apparatus can be slid or moved to enter a cab of the tractor unit of a vehicle.

FIG. 5 shows an example scenario where a slidable apparatus 210 can be slid to enter a cab of the tractor unit of a vehicle 202. The laser level device 228 coupled to an end of the slidable apparatus 210 can project a laser line in a region inside the cab or inside of the vehicle 202 so that a distance can be measured by the laser measurement device 204 from the laser measurement device 204 to a target plate 206 associated with a position of the two vertical bars 224*a*, 224*b*. Another distance can be measured from the laser line projected by the laser level device 228 to a device in the cab (e.g., an inertial measurement unit (IMU) so that a distance can be computed from a location of the laser measurement device 204 (e.g., a front axle of the vehicle 202) to the IMU. Thus, one of the technical benefits of the mechanical measurement apparatus is that it can enable measurement between two points where one of the points is located in a vehicle (e.g., a cab) where a location of the point inside the vehicle may not be easily found outside the vehicle.

A technical benefit of the mechanical measurement apparatus described in this patent application is that it can be used to measure distances between two points on or in a vehicle. For example, a distance can be computed from a front axle to a device (e.g., IMU) as explained above in the context of FIG. 5. In another example, a distance can be measured from a front axle to a point on a fifth wheel (e.g., a center of the fifth wheel). Another technical benefit of the mechanical measurement apparatus is that it can provide provides quick and repeatable measurement of points on or in a vehicle (e.g., a total length of a truck, a location of the fifth wheel, a location of one or more axels on a trailer unit coupled to a tractor unit). Such configuration data can be stored by and used by a computer(s) or server(s) located in a vehicle to determine the appropriate controls (e.g., steering angle) for the vehicle to operate along a determined trajectory.

Figure 6:
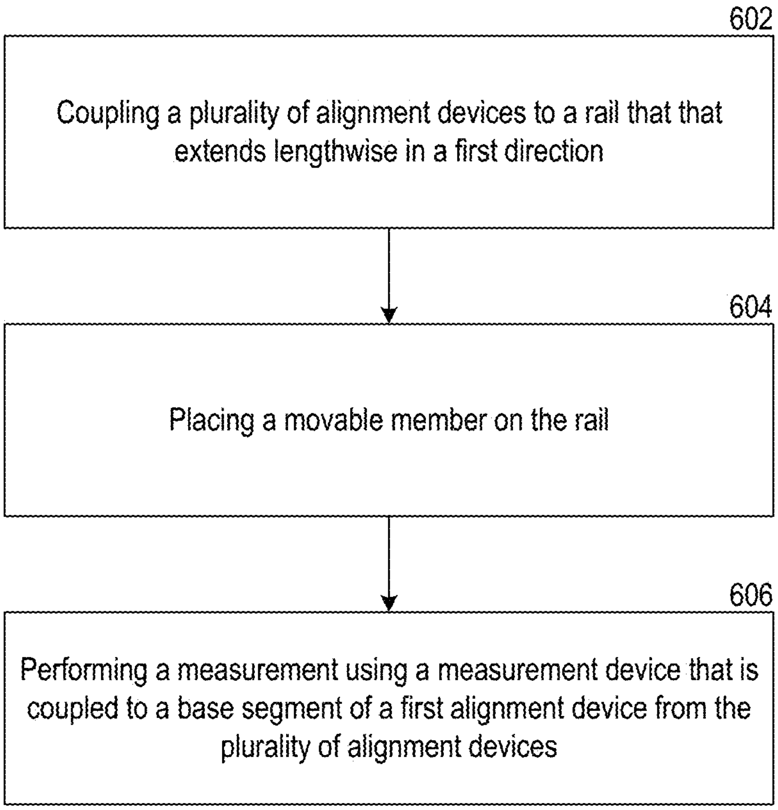
FIG. 6 shows a flowchart to perform one or more measurements.

FIG. 6 shows a flowchart to perform one or more measurements. Operation 602 includes coupling a plurality of alignment devices to a rail that that extends lengthwise in a first direction, where each alignment device extends in a third direction perpendicular to the first direction. Operation 604 includes placing a movable member on the rail, where the movable member is structured to move along the rail in the first direction, where the movable member vertically extends in a second direction that is perpendicular to the first direction and the third direction, where the movable member includes a region that is couplable to a first laser source device that is configured to project a first laser line, and where the movable member includes a surface. Operation 606 includes performing a measurement using a measurement device that is coupled to a base segment of a first alignment device from the plurality of alignment devices, where the measurement device is configured to project a laser beam on the surface to measure a distance between a first location of the measurement device and a second location of the movable member.

In some embodiments, the measurement device includes a display that shows the distance between the first location of the measurement device and the second location of the movable member. In some embodiments, each of the plurality of alignment devices includes one end that that furthest away from the rail, wherein the one end of each of the plurality of alignment devices is in contact with a wheel of a vehicle. In some embodiments, the surface is coupled to a bottom region of the movable member. In some embodiments, the rail has a same length that is greater than or equal to than another length from a front bumper of a vehicle to a rear bumper of the vehicle.

An example measurement apparatus comprises a rail that extends lengthwise in a first direction; a movable member that is movably coupled to the rail to move along the rail in the first direction, where the movable member vertically extends in a second direction that is perpendicular to the first direction, where the movable member includes a region that is couplable to a first laser source device, and where the movable member includes a surface; and a plurality of alignment devices coupled to the rail, where each alignment device extends in a third direction perpendicular to the first direction and the second direction, and where the plurality of alignment devices includes a first alignment device that comprises a base segment which is couplable to a measurement device.

In some embodiments, the rail includes two beams that are coupled to each other via a plurality of bars that extend between the two beams, wherein each bar is located at some distance away from at least one other bar. In some embodiments, at least two bars of the plurality of bars have a same length along the third direction. In some embodiments, the movable member comprises a first vertical bar and a second vertical bar, the first vertical bar and the second vertical bar extend upward and away from the rail in the second direction, a bottom region of the first vertical bar and the second vertical bar is coupled to the rail, and the first vertical bar includes the region that is couplable to the first laser source device.

In some embodiments, the first vertical bar has a first height, and the second vertical bar has a second height, wherein the first height and the second height are along the second direction. In some embodiments, the first height is same as the second height. In some embodiments, the measurement apparatus further comprises a slidable apparatus movable coupled to a top region of the first vertical bar and the second vertical bar, where the slidable apparatus is structured to move towards or away from the movable member, and one end of the slidable apparatus includes another region that is couplable to a second laser source device. In some embodiments, the first alignment device includes the base segment and two end sections, the base segment is coupled to the rail, and first ends of the two end sections furthest away from the base segment are separated by some distance.

In some embodiments, one end of the base segment is coupled to a first end of each of two middle sections, each of the two middle sections extends at an angle away from the base segment, and second ends of the two middle sections are respectively and pivotably coupled to second ends of the two end sections. In some embodiments, the second ends of the two middle sections are respectively and pivotably coupled to the second ends of the two end sections via spring loaded hinges. In some embodiments, the plurality of alignment devices includes a second alignment device and a third alignment device that extend in the third direction, and one end of the second alignment device and one end of the third alignment device are coupled the rail. In some embodiments, the second alignment device and the third alignment device have a same length along the third direction, the second alignment device is coupled to a first bar segment and the third alignment device is coupled to a second bar segment at a same predetermined location, and the second alignment device and the third alignment device are respectively perpendicular to the first bar segment and the second bar segment.

In some embodiments, the second alignment device is coupled to a first bar segment at a pre-determined distance from one end of the second alignment device, the third alignment device is coupled to a second bar segment at the pre-determined distance from one end of the third alignment device, and the second alignment device and the third alignment device are respectively perpendicular to the first bar segment and the second bar segment. In some embodiments, the measurement apparatus further comprises a third bar segment having a first clamp on a first end and a second clamp on a second end, wherein the first clamp and the second clamp are removably coupled to the second alignment device and the third alignment device. In some embodiments, the third bar segment has a length that is greater than a third distance between the second alignment device and the third alignment device, and the length is along the first direction.

In this document the term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A measurement apparatus, comprising:

a rail that extends lengthwise in a first direction;

a movable member that is movably coupled to the rail to move along the rail in the first direction, wherein the movable member vertically extends in a second direction that is perpendicular to the first direction, wherein the movable member includes a region that is couplable to a first laser source device, and wherein the movable member includes a surface; and a plurality of alignment devices coupled to the rail, wherein each alignment device extends in a third direction perpendicular to the first direction and the second direction, and wherein the plurality of alignment devices includes a first alignment device that comprises a base segment which is couplable to a measurement device and two end sections, wherein the base segment is coupled to the rail, and wherein first ends of the two end sections furthest away from the base segment are separated by some distance, wherein each of the plurality of alignment devices includes one end that is furthest away from the rail, wherein each of the plurality of alignment devices are configured to contact with a wheel of a vehicle.

2. The measurement apparatus of claim 1, wherein the rail includes two beams that are coupled to each other via a plurality of bars that extend between the two beams, wherein each bar is located at some distance away from at least one other bar.

3. The measurement apparatus of claim 2, wherein at least two bars of the plurality of bars have a same length along the third direction.

4. The measurement apparatus of claim 1, wherein the movable member comprises a first vertical bar and a second vertical bar, wherein the first vertical bar and the second vertical bar extend upward and away from the rail in the second direction, wherein a bottom region of the first vertical bar and the second vertical bar is coupled to the rail, and wherein the first vertical bar includes the region that is couplable to the first laser source device.

5. The measurement apparatus of claim 4, wherein the first vertical bar has a first height, and the second vertical bar has a second height, wherein the first height and the second height are along the second direction.

6. The measurement apparatus of claim 5, wherein the first height is same as the second height.

7. The measurement apparatus of claim 4, further comprising:

a slidable apparatus movably coupled to a top region of the first vertical bar and the second vertical bar, wherein the slidable apparatus is structured to move towards or away from the movable member, and wherein one end of the slidable apparatus includes another region that is couplable to a second laser source device.

8. The measurement apparatus of claim 1, wherein one end of the base segment is coupled to a first end of each of two middle sections, wherein each of the two middle sections extends at an angle away from the base segment, and wherein second ends of the two middle sections are respectively and pivotably coupled to second ends of the two end sections.

9. The measurement apparatus of claim 8, wherein the second ends of the two middle sections are respectively and pivotably coupled to the second ends of the two end sections via spring loaded hinges.

10. The measurement apparatus of claim 1, wherein the plurality of alignment devices includes a second alignment device and a third alignment device that extend in the third direction, and wherein one end of the second alignment device and one end of the third alignment device are coupled to the rail.

11. The measurement apparatus of claim 10, wherein the second alignment device and the third alignment device have a same length along the third direction, wherein the second alignment device is coupled to a first bar segment and the third alignment device is coupled to a second bar segment at a same predetermined location, and wherein the second alignment device and the third alignment device are respectively perpendicular to the first bar segment and the second bar segment.

12. The measurement apparatus of claim 10, wherein the second alignment device is coupled to a first bar segment at a pre-determined distance from one end of the second alignment device, wherein the third alignment device is coupled to a second bar segment at the pre-determined distance from one end of the third alignment device, and wherein the second alignment device and the third alignment device are respectively perpendicular to the first bar segment and the second bar segment.

13. The measurement apparatus of claim 10, further comprising:

a third bar segment having a first clamp on a first end and a second clamp on a second end, wherein the first clamp and the second clamp are removably coupled to the second alignment device and the third alignment device.

14. The measurement apparatus of claim 13, wherein the third bar segment has a length that is greater than a third distance between the second alignment device and the third alignment device, and wherein the length is along the first direction.

15. A method of measuring a dimension, comprising:

coupling a plurality of alignment devices to a rail that extends lengthwise in a first direction, wherein each alignment device extends in a third direction perpendicular to the first direction;

placing a movable member on the rail, wherein the movable member is structured to move along the rail in the first direction, wherein the movable member vertically extends in a second direction that is perpendicular to the first direction and the third direction, wherein the movable member includes a region that is couplable to a first laser source device that is configured to project a first laser line, and wherein the movable member includes a surface; and performing a measurement using a measurement device that is coupled to a base segment of a first alignment device from the plurality of alignment devices, wherein the first alignment device comprises two end sections, wherein the base segment is coupled to the rail, and wherein first ends of the two end sections furthest away from the base segment are separated by some distance, wherein the measurement device is configured to project a laser beam on the surface to measure a distance between a first location of the measurement device and a second location of the movable member, wherein each of the plurality of alignment devices are configured to contact with a wheel of a vehicle during the measurement.

16. The method of claim 15, wherein the measurement device includes a display that shows the distance between the first location of the measurement device and the second location of the movable member.

17. The method of claim 15, wherein the surface is coupled to a bottom region of the movable member.

18. The method of claim 15, wherein the rail has a same length that is greater than or equal to than another length from a front bumper of a vehicle to a rear bumper of the vehicle.

* * * * *